March 23, 1965  E. LANGECKER  3,174,181
MULTI-PART BLOW MOLD FOR MANUFACTURING HOLLOW
BODIES FROM THERMOPLASTICS
Filed March 1, 1963

Inventor:
ERHARD LANGECKER
By Young & Thompson
ATTYS.

United States Patent Office 3,174,181
Patented Mar. 23, 1965

3,174,181
MULTI-PART BLOW MOLD FOR MANUFACTURING HOLLOW BODIES FROM THERMOPLASTICS
Erhard Langecker, 32 Oststrasse, Meinerzhagen, Germany
Filed Mar. 1, 1963, Ser. No. 261,999
7 Claims. (Cl. 18—2)

This invention relates to blow-molding, and more especially to the removal of the "burr," or waste squeezed-out material adhering to the blown article, from the finished article.

For the manufacture of hollow bodies from thermoplastic materials one uses usually a blank (for example, in the shape of a hose or of a prefabricated component formed by compressing or welding individual plates or strips) capable of being expanded by blowing. This blank is squeezed between the parts of the blow mold; during this process there are formed, on the outer edges of the eventual hollow body burrs of waste material which project beyond the blow mold and which must be separated from the hollow body to be manufactured. This is usually effected by hand, but there have already been attempts to make the squeezing edges so sharp that the squeezed-off material is separated from the finished product as this is extracted from the mold, by the vibration of the machine alone.

It is also known to provide pins for removing the burrs formed during the molding.

Newer blowing machines make fully automatic operation possible so that the machine requires no operator, and several such machines may be supervised by one person. However, with these machines the burr cannot be reliably separated from the product, and cleaning may be necessary. Moreover, detached parts may remain in the mold and cause an obstruction during the next blowing cycle.

The invention has for an object the elimination of this drawback, and the enabling of fully automatic operation of the machine by mechanically removing waste and ejecting it when the mold is opened.

To this end a multi-part blow mold for manufacturing hollow bodies from thermoplastic materials, in which a burr is produced protruding beyond the blow mold during the closure and which is separated during the opening movement, comprises pins arranged staggered relatively to each other, for instance, on opposite parts of the blow mold so that they cause the burr to be bent in a wave-shaped configuration. The pins either remove the burr completely or leave it attached in such a flimsy fashion that it can be removed extremely easily.

These pins may be mounted on movable plates which carry further pins for moving the said plates away from the mold parts as the mold is closed, said further pins being also arranged on both mold portions staggered relatively to each other.

The ejecting movement may be effected or helped by springs, or by coupling the ejector plates with the mold part on the remote side of the mold, for example, by detachable claws or catches.

The invention further consists in a mold for blow molding provided with a plurality of spaced pins for removing the burr squeezed out during molding, in which successive pins are arranged staggered so as to contact the burr from opposite sides and are capable of deforming it into a wavy shape for facilitating its removal. Usually operation of the pins is controllable by opening the mold. In a preferred embodiment, the burr removal pins pass through the mold sections and are mounted on plates which carry further spacer pins for moving the plates away from the mold section, through which the corresponding removal pins pass, as the mold is closed.

Spring means may be provided to operate the burr removal pins to deform the burr as the mold is opened. Alternatively, or possibly in addition to this, the burr removal pins are so coupled to a mold section other than that through which they pass that they move to deform the burr as the mold is opened. This may be done, for example, by mounting the burr removal pins on plates which are coupled to the said other mold section by a catch which engages with the other mold section as the mold closes and disengages from the other mold section when the mold becomes fully open.

The accompanying drawings show, by way of example, two embodiments of the invention:

Figure 1:
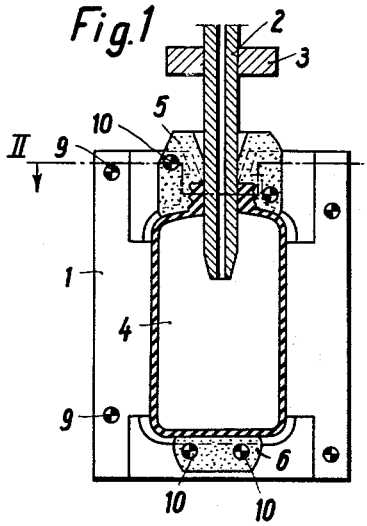
FIGURE 1 is a cross-section along the line I—I in FIGURE 2 of a closed mold for making bottles from hose-shaped blanks, the part of the hose located in the mold being shown in the expanded condition.

The drawing shows a part 1 of a two-piece blow mold into which is fitted a hose-shaped blank before the mold is closed, and into which the blowing mandrel 2 is inserted from the top into the hose. The two halves are then pressed together and the hose is inflated so that the blanks assumed the shape shown in FIGURE 1. It consists of the expanded hollow body 4 and the squeezed waste portions or burrs 5 and 6 at the neck and base.

For the sake of clarity, in FIGURE 1 the part within the mold and forming the hollow body is shown in double shading, and the squeezed portion outside the mold is dotted. The burr is joined to the hollow body only along the seams.

Figure 2:
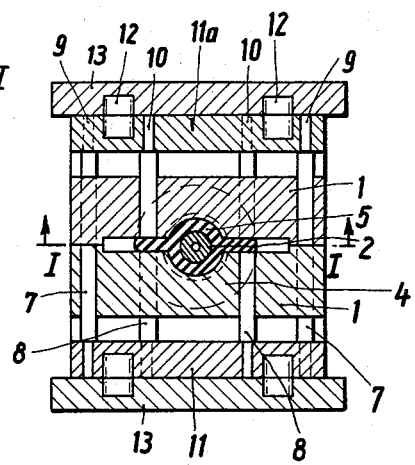
FIGURE 2 is a cross-sectional along the line II—II in FIGURE 1.

According to the invention, the burrs are to be automatically separated and ejected when the mold is opened. To this end, there are provided burr removal pins 8 and 10, pins 8 being mounted on one plate 11 and the pins 10 on another plate 11a. These plates 11 and 11a rest against base plates 13 and are displaceable in the direction towards and away from the mold. In the retracted position of the plates, shown in FIGURE 2, the inner ends of the burr removal pins are in the same plane as the cavity of the blow mold, in which the two sides of the burr 5 or 6 are located when the mold is closed.

In addition to the burr removal pins 8 and 10, there are provided return or spacer pins 7 and 9 of which the pins 7 are mounted on the plate 11 and the pins 9 on the plate 11a. These pins are of such a length that when the mold is closed their end faces lie in the dividing plane of the mold when the plates 11 and 11a are in the retracted position. These pins are for returning the base plates into the FIGURE 2 position when the mold is closed. For the movement of the burr removal pins during the opening any known means may be used, and there may be provided additionally springs 12, partly sunken into the base plate 13 of the mold.

Both of the burr removal pins and the return pins are offset or staggered one against the other in the mold parts, that is to say, the burr removal pins of the one mold part rest against other points of the burr than the burr removal pins of the other mold part. Similarly, the spacer pins of the one mold part rest against other points of the mold closing surface than those of the other mold part. The arrangement is such that, during the opening of the mold (that is, during the approach of the mold parts towards the plates 11 and 11a), the burr removal pins, moving towards the burr, cause it to be distorted to a wavy shape and to be sheared off the blown part. When the waste material is not detached completely from the blown part, this is effected subsequently in that the distorted parts tend to resume their original position and become detached automatically from the ejector pins.

Figure 3:
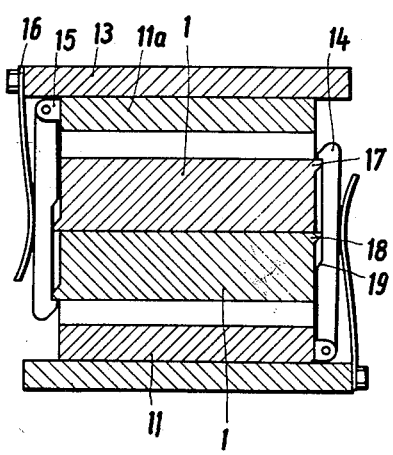
FIGURE 3 shows a similar construction to FIGURE 1 with certain modifications.

In the embodiment of FIGURE 3, the springs 12 are replaced by claws 14 pivotably mounted in lugs 15 of the plates 11 and 11a. In addition, the base plates 13 have springs 16, urging the claws against the mold so that the hooked ends of the claws 14 grip the part of the mold through projections 17. The claws therefore lock the two plates 11 and 11a when the mold closes, each with the remote part of the mold, and during the opening of the mold, the claws 14 carry along the corresponding plates 11 and 11a bearing the burr removal pins located behind the other mold part.

Towards the end of the opening movement, lugs 18 on the other parts of the mold engage with a sloping surface 19 on the claws and open the claws against the action of springs 16. The action of the burr removal pins is as described hereinbefore.

Naturally, both these features may be combined, and both springs and claws may be provided so that the reliability of the installation is increased.

As already mentioned, the special arrangement of the pins causes the burr tongues to be displaced in a wavy shape and to be torn off the blown part. However, especially for removing the burr from the neck of the bottle, the burr removal pins may be so arranged that the burr carries out a rotary movement during the opening of the mold relative to the bottle which is still mounted on the mandrel. This is effected in that, viewed in the direction towards the interior of the mold, the removal pin is mounted on the right side of the mold side. In order to remove also the burr around the thread, the removal pin is mounted on the left side. This causes a rotation to the left of the waste material above the sealing surface of the bottle neck whilst the material below this plane carries out a rotation to the right causing the material to shear off the neck of the bottle. Naturally, the rotary movements may be effected also in the opposite directions.

After the complete opening of the mold, the mandrel is retracted and the blown part and waste is stripped off the mandrel by a scraper ring 3 and removed between the mold parts, either towards the top or bottom according to the design of the mandrel.

If the mandrel is extracted towards the bottom, the waste may be blown off, whilst when it is removed towards the top, it may be allowed to drop out.

Figure 4:
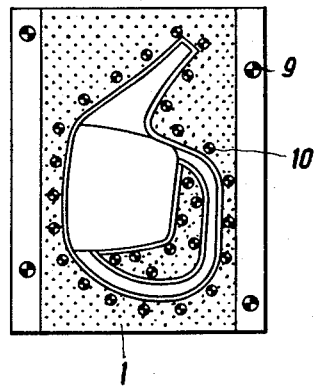
FIGURE 4 shows a further embodiment in diagrammatical representation.

The arrangement of removal pins and return pins will, of course, always depend on the shape of the object to be molded. In the manufacture of objects in which the waste material must be removed around the entire blown part, such as shown by way of example in FIGURE 4, the ejector pins alternate so that during the opening movement the waste material is pressed off and is allowed to drop out of the mold together with the hollow body. With the size of the blown body of FIGURE 4, the use of springs alone will be insufficient. In these cases pneumatic cylinders may be conveniently used for operating the ejector plate, and claws may be provided additionally.

The arrangement of the pins and their numbers, as well as their distances one from the other depends on the individual requirements and the number of co-operating mold parts. It is also possible to use different numbers of pins on both parts of the mold, and it is only essential that the pins should be such that the blown part is held in the centre and that the separation of the squeezed portion is possible.

I claim:

1. A mold comprising a plurality of separable mold sections, a first pin disposed adjacent a joint between a pair of adjacent mold sections, means for moving said first pin in a direction opposite to the direction of movement of one of the mold sections upon opening the mold, a second pin disposed adjacent said joint, means for moving said second pin in a direction opposite to the direction of movement of said first pin upon said opening of the mold, the pins being laterally offset from each other, the pins being movable from positions in which they do not overlie each other laterally when the mold is closed to positions in which they overlie each other laterally when the mold is open.

2. A mold comprising a plurality of separable mold sections, a plurality of first pins disposed adjacent a joint between a pair of adjacent mold sections, means for moving said first pins jointly in a direction opposite to the direction of movement of one of the mold sections upon opening the mold, a plurality of second pins disposed adjacent said joint, means for moving said second pins jointly in a direction opposite to the direction of movement of said first pins upon said opening of the mold, the pins being laterally offset from each other and interfingering with each other upon opening of the mold.

3. A mold comprising a plurality of separable mold sections, a first elongated pin disposed adjacent a joint between a pair of adjacent mold sections, means for moving said first pin lengthwise in a direction opposite to the direction of movement of one of the mold sections upon opening of the mold, a second elongated pin disposed adjacent said joint, means for moving said second pin lengthwise in a direction opposite to the direction of movement of said first pin upon said opening of the mold, the pins being laterally offset from each other, the pins being movable from positions in which they do not overlie each other laterally when the mold is closed to positions in which they overlie each other laterally when the mold is open.

4. A mold comprising a pair of separable mold sections having a joint between them that is disposed in a plane, a first pin disposed on one side of said plane when the mold is closed, means for moving said first pin toward and beyond said plane upon opening of the mold, a second pin disposed on the other side of said plane when the mold is closed, and means for moving said second pin toward and beyond said plane upon opening of the mold, the paths of movement of the pins being laterally offset from each other.

5. A mold as claimed in claim 4, the paths of movement of the pins being parallel to each other.

6. A mold comprising a pair of separable mold sections having a joint between them that is disposed in a plane, a plurality of first pins disposed on one side of said plane when the mold is closed, means for moving said first pins jointly toward and beyond said plane upon opening of the mold, a plurality of second pins disposed on the other side of said plane when the mold is closed, and means for jointly moving said second pins toward and beyond said plane upon opening of the mold, the paths of movement of the pins being laterally offset from each other.

7. A mold comprising a pair of separable mold sections having a joint between them that is disposed in a plane, a first elongated pin disposed on one side of said plane when the mold is closed, means for moving said first pin lengthwise toward and beyond said plane upon opening of the mold, a second elongated pin disposed on the other side of said plane when the mold is closed, and means for moving said second pin lengthwise toward and beyond said plane upon opening of the mold, the paths of movement of the pins being laterally offset from each other.

References Cited by the Examiner

UNITED STATES PATENTS

| | | | |
|---|---|---|---|
| 2,252,363 | 8/41 | Carus | 225—97 |
| 2,392,459 | 1/46 | Casalino | 83—914 XR |
| 2,748,434 | 6/56 | Amo | 18—2 |
| 2,828,507 | 4/58 | Strauss | 18—2 |
| 3,104,425 | 9/63 | Crane et al. | |

WILLIAM J. STEPHENSON, *Primary Examiner.*